United States Patent
Chiu et al.

(10) Patent No.: US 10,867,598 B2
(45) Date of Patent: Dec. 15, 2020

(54) SEMANTIC ANALYSIS METHOD, SEMANTIC ANALYSIS SYSTEM AND NON-TRANSITORY COMPUTER-READABLE MEDIUM

(71) Applicant: INSTITUTE FOR INFORMATION INDUSTRY, Taipei (TW)

(72) Inventors: Yu-Shian Chiu, Taoyuan (TW); Wei-Jen Yang, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 122 days.

(21) Appl. No.: 16/215,604

(22) Filed: Dec. 10, 2018

(65) Prior Publication Data

US 2020/0160851 A1 May 21, 2020

(30) Foreign Application Priority Data

Nov. 20, 2018 (TW) .............................. 107141301 A

(51) Int. Cl.
  *G10L 15/18* (2013.01)
  *G10L 15/05* (2013.01)
(52) U.S. Cl.
  CPC .......... *G10L 15/1815* (2013.01); *G10L 15/05* (2013.01); *G10L 15/1822* (2013.01)
(58) Field of Classification Search
  CPC ... G10L 15/1815–197; G10L 15/04–05; G10L 15/1822
  See application file for complete search history.

(56) References Cited

U.S. PATENT DOCUMENTS

| | | | |
|---|---|---|---|
| 8,346,563 B1 | 1/2013 | Hjelm et al. | |
| 9,875,237 B2 | 1/2018 | Sarikaya et al. | |
| 10,068,174 B2 | 9/2018 | Aili et al. | |
| 2009/0030686 A1* | 1/2009 | Weng | G10L 15/1822 704/240 |
| 2019/0139540 A1* | 5/2019 | Kanda | G10L 15/19 |
| 2019/0213284 A1* | 7/2019 | Anand | G06F 9/453 |
| 2019/0295533 A1* | 9/2019 | Wang | G10L 25/90 |
| 2020/0020325 A1* | 1/2020 | Nam | G06F 16/322 |
| 2020/0027446 A1* | 1/2020 | Ture | G06F 16/322 |

\* cited by examiner

*Primary Examiner* — Stella L. Woo
(74) *Attorney, Agent, or Firm* — CKC & Partners Co., LLC

(57) ABSTRACT

A semantic analysis method, semantic analysis and non-transitory computer-readable medium are provided in this disclosure. The semantic analysis method includes the following operations: inputting a voice and recognizing the voice to generate an input sentence, wherein the input sentence includes a plurality of vocabularies; selecting at least one key vocabulary from the vocabularies according to a word property corresponding to each vocabulary; establishing a parse tree according to the input sentence and finding a plurality of associated sub-sentences; calculating an associated feature vector between the associated sub-sentences; concatenating the associated feature vector and the vocabulary vector corresponding to each vocabulary to generate a vocabulary feature vector corresponding to each vocabulary; and analyzing the vocabulary feature vector to generate an analysis result by a semantic analysis model, wherein the analysis result includes a slot type corresponding to each vocabulary and an intent corresponding to the input sentence.

17 Claims, 6 Drawing Sheets

SEMANTIC ANALYSIS METHOD, SEMANTIC ANALYSIS SYSTEM AND NON-TRANSITORY COMPUTER-READABLE MEDIUM

CROSS-REFERENCE TO RELATED APPLICATION

This application claims priority to Taiwanese Application Serial Number 107141301, filed on Nov. 20, 2018, which is herein incorporated by reference.

BACKGROUND

Field of Invention

The present application relates to a semantic analysis method, semantic analysis system, and non-transitory computer-readable medium. Specifically, the present application relates to a semantic analysis method for analyzing intent of natural language, semantic analysis system and non-transitory computer-readable medium.

Description of Related Art

Recently, natural language understanding (NLU) techniques has matured (e.g., Siri or google speech recognition). Users are also using voice input or voice control functions when operating electronic devices such as mobile devices or personal computers. However, natural language understanding techniques are often utilized to marking data or key information to perform neural networks training, but the method of this way would consume a lot of time, and poor accuracy. Therefore, a semantic analysis method for increasing the accuracy of natural language understanding techniques without spending too much processing time is required.

SUMMARY

The main object of the disclosure is to provide a semantic analysis method, a semantic analysis system and non-transitory computer-readable medium are capable of utilizing the word property and the parse tree to find the key vocabularies and the associated sub-sentences. In some embodiments, this disclosure is able to increase the accuracy of natural language understanding techniques.

An aspect of the disclosure is to provide a semantic analysis method. The semantic analysis method includes operations of: inputting a voice and recognizing the voice to generate an input sentence; wherein the input sentence includes a plurality of vocabularies, and a vocabulary vector corresponding to each vocabulary; selecting at least one key vocabulary from the vocabularies according to a word property corresponding to each vocabulary; establishing a parse tree according to the input sentence and finding a plurality of associated sub-sentences according to the parse tree and the at least one key vocabulary; wherein each associated sub-sentences includes a part of the vocabularies; calculating an associated feature vector between the associated sub-sentences; concatenating the associated feature vector and the vocabulary vector corresponding to each vocabulary to generate a vocabulary feature vector corresponding to each vocabulary; and analyzing the vocabulary feature vector to generate an analysis result by a semantic analysis model; wherein the analysis result includes a slot type corresponding to each vocabulary and an intent corresponding to the input sentence.

Another aspect of the disclosure is to provide a semantic analysis system. The semantic analysis system includes an audio receiver, a processor and a storage device. The audio receiver is configured for receiving the voice. The processor is electrically connected to the audio receiver. The storage device is configured for storing the input sentence and the semantic analysis model. The processor comprises a voice recognition unit, a keyword selecting unit, an associated sub-sentence generating unit, a feature vector calculating unit, a vocabulary vector generating unit and an analysis result generating unit. The voice recognition unit is configured for recognizing the voice to generate an input sentence; wherein the input sentence includes a plurality of vocabularies, and a vocabulary vector corresponding to each vocabulary. The keyword selecting unit is electrically connected to the voice recognition unit, and configured for selecting at least one key vocabulary from the vocabularies according to a word property corresponding to each vocabulary. The associated sub-sentence generating unit is electrically connected to the keyword selecting unit, and configured for establishing a parse tree according to the input sentence and finding a plurality of associated sub-sentences according to the parse tree and the at least one key vocabulary; wherein each associated sub-sentence includes a part of the vocabularies. The feature vector calculating unit is electrically connected to the associated sub-sentence generating unit, and configured for calculating an associated feature vector between the associated sub-sentences. The vocabulary vector generating unit is electrically connected to the feature vector calculating unit, and configured for concatenating the associated feature vector and the vocabulary vector corresponding to each vocabulary to generate a vocabulary feature vector corresponding to each vocabulary. The analysis result generating unit is electrically connected to the vocabulary vector generating unit, and configured for analyzing the vocabulary feature vector to generate an analysis result by a semantic analysis model; wherein the analysis result includes a slot type corresponding to each vocabulary and an intent corresponding to the input sentence.

Another aspect of the disclosure is to provide a non-transitory computer-readable medium including one or more sequences of instructions to be executed by a processor for performing a semantic analysis method, wherein the semantic analysis method includes operations of: inputting a voice and recognizing the voice to generate an input sentence; wherein the input sentence includes a plurality of vocabularies, and a vocabulary vector corresponding to each vocabulary; selecting at least one key vocabulary from the vocabularies according to a word property corresponding to each vocabulary; establishing a parse tree according to the input sentence and finding a plurality of associated sub-sentences according to the parse tree and the at least one key vocabulary; wherein each associated sub-sentence includes a part of the vocabularies; calculating an associated feature vector between the associated sub-sentences; concatenating the associated feature vector and the vocabulary vector corresponding to each vocabulary to generate a vocabulary feature vector corresponding to each vocabulary; and analyzing the vocabulary feature vector to generate an analysis result by a semantic analysis model; wherein the analysis result includes a slot type corresponding to each vocabulary and an intent corresponding to the input sentence.

Based on aforesaid embodiments, the semantic analysis method, semantic analysis system and non-transitory computer-readable medium are capable of utilizing the word property and the parse tree to find the key vocabularies and the associated sub-sentences, utilizing the N-gram calculation to calculate the feature vector, and calculating the intent corresponding to the input sentence and the slot type corresponding to each vocabulary. In some embodiments, this disclosure is able to increase the accuracy of natural language understanding techniques.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
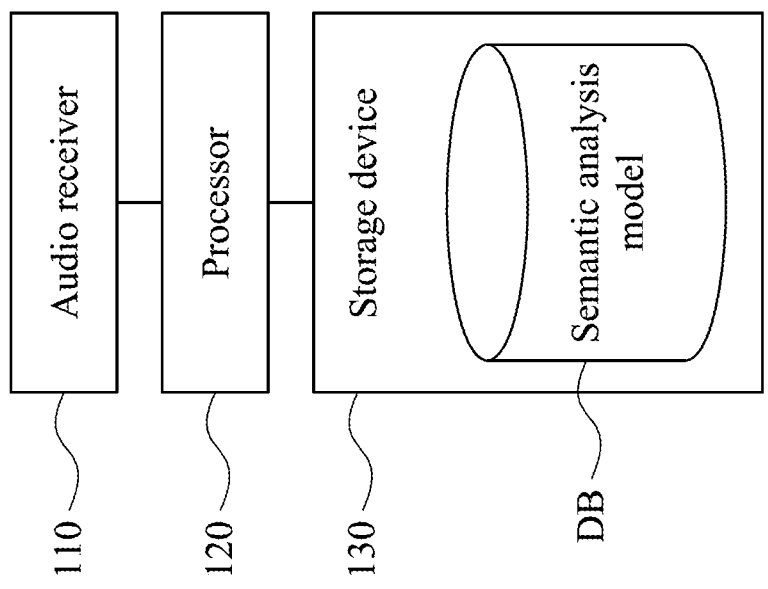
FIG. 1 is a functional block diagram illustrating a semantic analysis system according to an embodiment of the disclosure.

Reference is made to FIG. 1, which is a functional block diagram illustrating a semantic analysis system 100 according to an embodiment of the disclosure. As shown in FIG. 1, the semantic analysis system 100 includes an audio receiver 110, a processor 120, and a storage device 130. The processor 120 is electrically connected to the audio receiver 110 and the storage device 130. The audio receiver 110 is configured to receive the voice, and the storage device 130 is configured to store the input sentence and the semantic analysis model DB. The processor 120 is configured to perform a semantic analysis for the input sentence and calculate the slot type corresponding to each vocabulary and the intent corresponding to the input sentence.

In the embodiments of the disclosure, the audio receiver 110 can be implemented by a microphone or an audio transceiver, etc. The processor 120 can be implemented as an integrated circuit, such as a micro-controller, a microprocessor, a digital signal processor, an application specific integrated circuit (ASIC), a logic circuit or other similar elements, or a combination thereof. The storage device 130 can be implemented by a memory, a hard disk, a flash drive, a memory card, etc.

Figure 2:
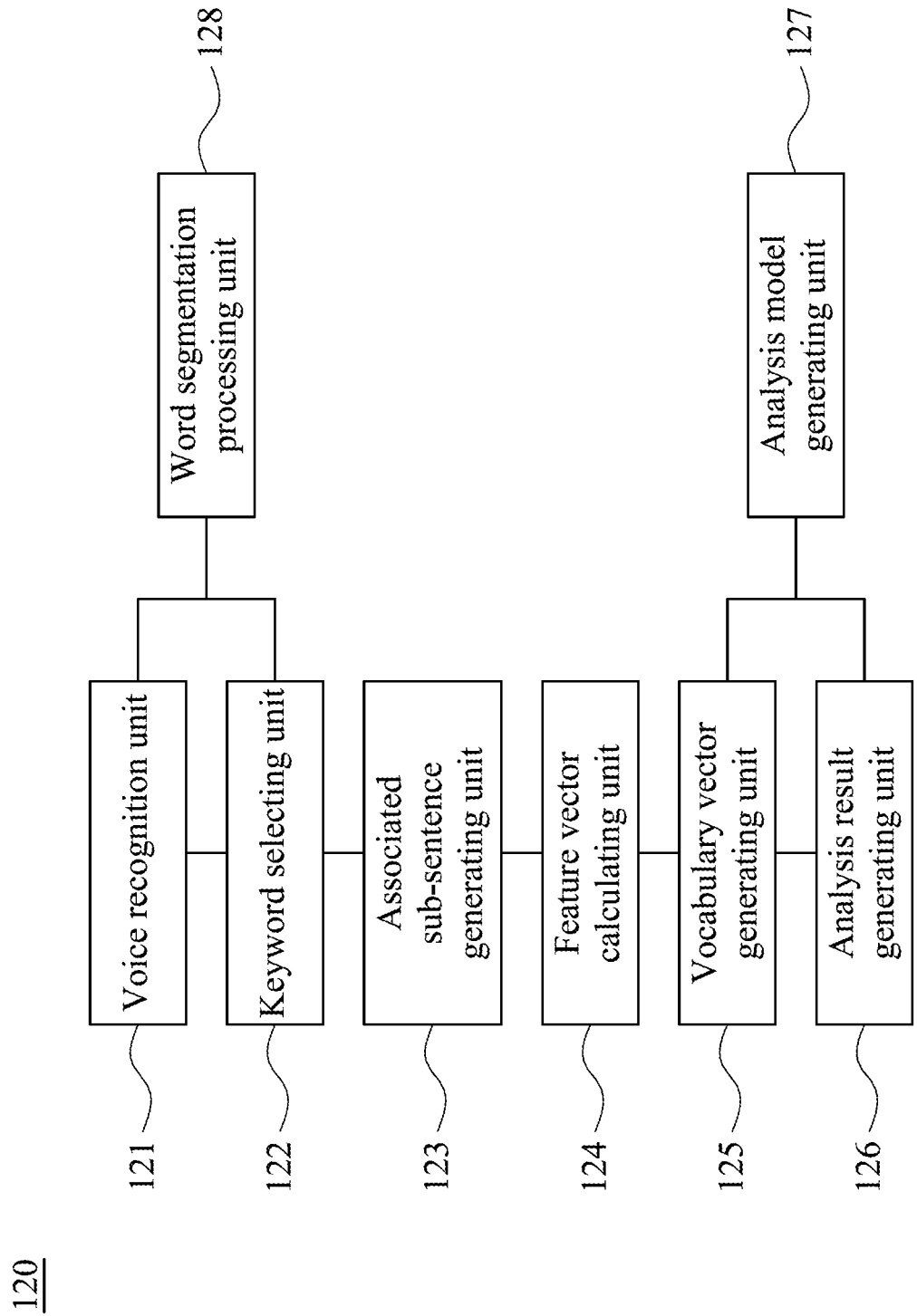
FIG. 2 is a functional block diagram illustrating a processor according to an embodiment of the disclosure.

Reference is made to FIG. 2, which is a functional block diagram illustrating a processor 120 according to an embodiment of the disclosure. As shown in FIG. 2, the processor 110 includes a voice recognition unit 121, a keyword selecting unit 122, an associated sub-sentence generating unit 123, a feature vector calculating unit 124, a vocabulary vector generating unit 125, an analysis result generating unit 126, an analysis model generating unit 127, and a word segmentation processing unit 128. The keyword selecting unit 122 is electrically connected to the voice recognition unit 121 and the associated sub-sentence generating unit 123. The word segmentation processing unit 128 is electrically connected to the voice recognition unit 121 and the keyword selecting unit 122. The feature vector calculating unit 124 is electrically connected to the associated sub-sentence generating unit 123 and the vocabulary vector generating unit 125. The vocabulary vector generating unit 125 is electrically connected to the analysis result generating unit 126. The analysis model generating unit 127 is electrically connected to the vocabulary vector generating unit 125 and the analysis result generating unit 126.

Figure 3:
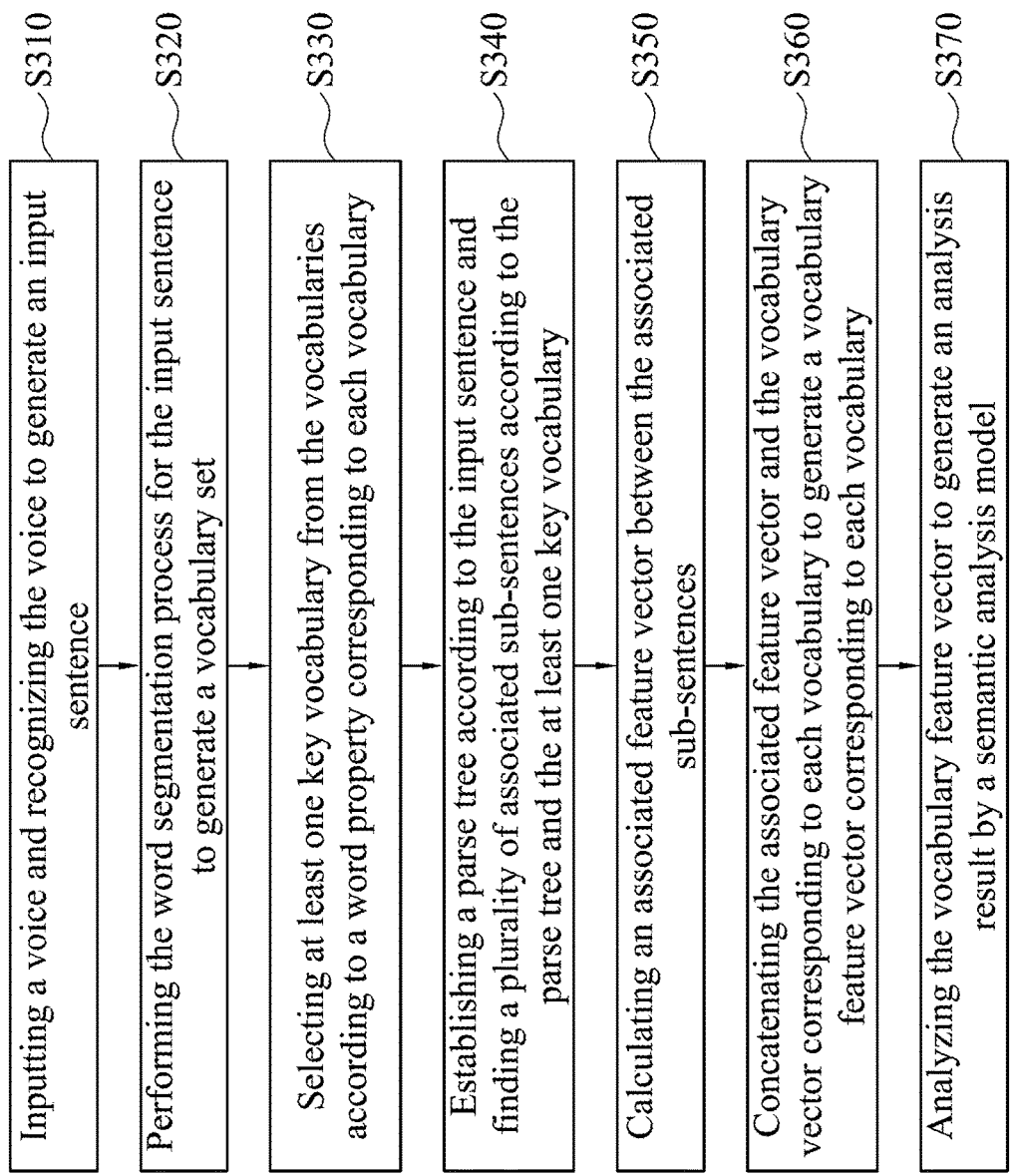
FIG. 3 is a flow diagram illustrating a semantic analysis method according to an embodiment of this disclosure.

Reference is made to FIG. 3, which is a flow diagram illustrating a semantic analysis method 300 according to an embodiment of this disclosure. In the embodiment, the semantic analysis method 300 can be applied to the training system 100 of FIG. 1. The processor 120 can be utilized to perform the semantic analysis for the input sentence and calculate the slot type corresponding to each vocabulary and the intent corresponding to the input sentence according to the following steps described in the semantic analysis method 300.

The semantic analysis method 300 firstly executes step S310 to input a voice and recognize the voice to generate an input sentence, and step S320 to perform the word segmentation process for the input sentence to generate a vocabulary set. In the embodiment, the vocabulary set includes a plurality of vocabularies, and a vocabulary vector corresponding to each vocabulary. For example, the input sentence is "I want to find the Samsung mobile phone with the student discount". After the word processing (e.g. word segmentation process), the input sentence can be divided into the vocabulary V1 (means as "want"), the vocabulary V2 (means as "I"), the vocabulary V3 (means as "to find"), the vocabulary V4 (means as "mobile phone"), the vocabulary V5 (means as "with"), the vocabulary V6 (means as "Samsung"), the vocabulary V7 (means as "the student discount"), and the vocabulary V8 (means as "the"). The vocabulary set can be formed by aforesaid eight vocabularies.

Afterwards, each vocabulary has the corresponding vocabulary vector, for example, the vocabulary V1 has the corresponding vocabulary vector (1, 2, 1), the vocabulary V2 has the corresponding vocabulary vector (1, 0, 9), the vocabulary V3 has the corresponding vocabulary vector (2, 3, 4), the vocabulary V4 has the corresponding vocabulary vector (2, 6, 7), the vocabulary V5 has the corresponding vocabulary vector (5, 4, 3), the vocabulary V6 has the corresponding vocabulary vector (7, 8, 9), the vocabulary V7 has the corresponding vocabulary vector (1, 7, 8), and the vocabulary V8 has the corresponding vocabulary vector (3, 0, 4).

Afterwards, the semantic analysis method 300 executes step S330 to select at least one key vocabulary from the vocabularies according to a word property corresponding to each vocabulary. It is notice that the nouns and proper nouns are usually the key words in natural language, and then the at least one key vocabulary is usually a part of the vocabularies. In aforesaid embodiment, the vocabulary V6, the vocabulary V7 and the vocabulary V4 are the key vocabularies in this embodiment.

Figure 4:
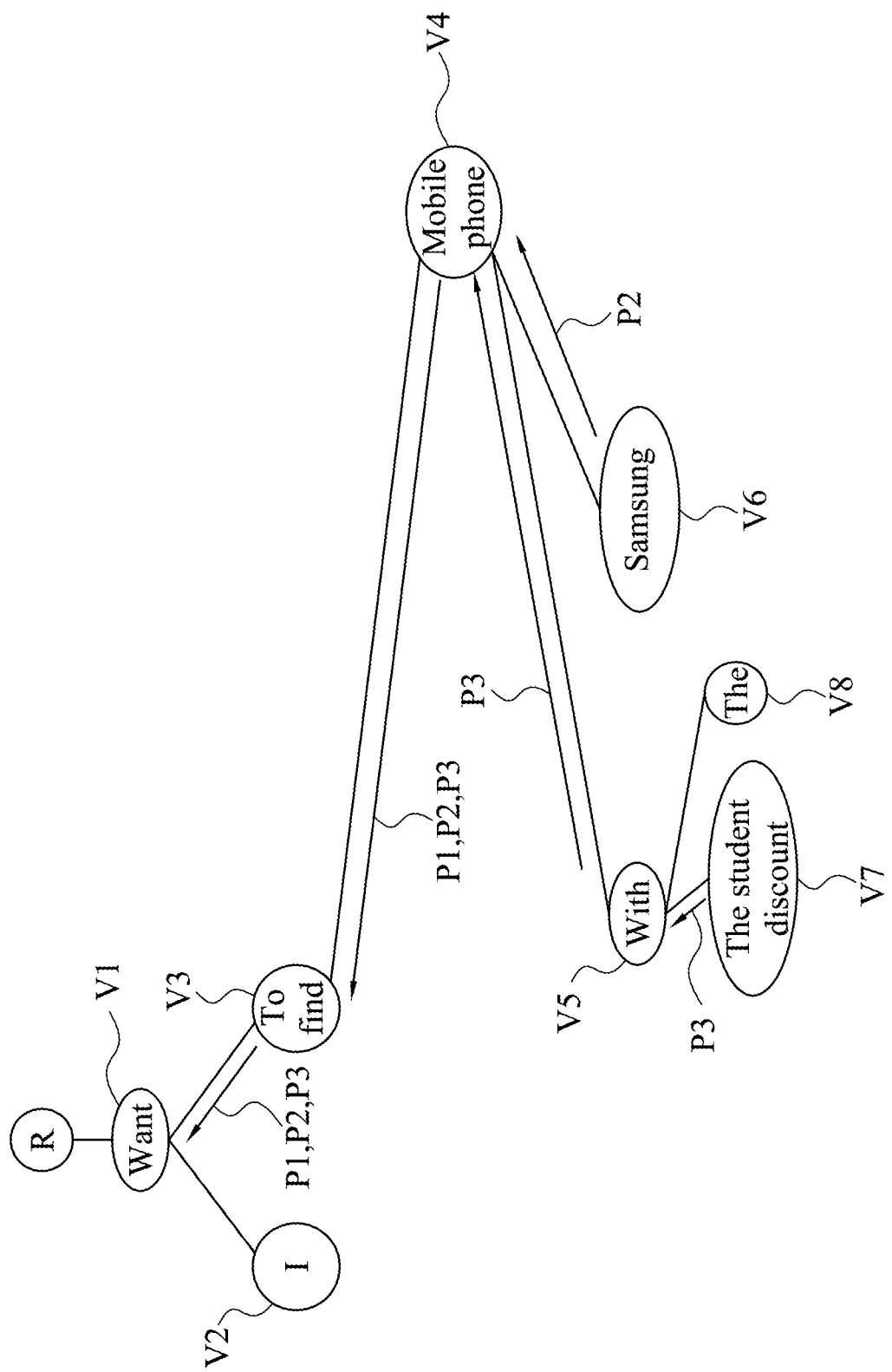
FIG. 4 is a schematic diagram illustrating the parse tree according to an embodiment of this disclosure.

Afterwards, the semantic analysis method 300 executes step S340 to establish a parse tree according to the input sentence and find a plurality of associated sub-sentences according to the parse tree and the at least one key vocabulary. Each associated sub-sentences includes a part of the vocabularies. Reference is made to FIG. 4, which is a schematic diagram illustrating the parse tree according to an embodiment of this disclosure. As the embodiment shown in FIG. 4, the parse tree is established by the vocabulary V1, the vocabulary V2, the vocabulary V3, the vocabulary V4, the vocabulary V5, the vocabulary V6, the vocabulary V7 and the vocabulary V8. In the embodiment, the parse tree can be established according to the Sinica Treebank from the Academia Sinica (http://treebank.sinica.edu.tw/), and the establishing method of the parse tree should not be limited thereto. When the parse tree is established, the associated sub-sentences generating unit 123 is configured to utilize the vocabulary V4, the vocabulary V6 and the vocabulary V7, respectively, as the start point, and go back to the root R via the relationship between the vocabularies, and then the associated sub-sentences can be formed by the passing vocabularies. For example, when the associated sub-sentences generating unit 123 is configured to utilize the vocabulary V4 as the start point and go back to the root R via the path P1, the vocabulary V3 and the vocabulary V1 are passed, and thus the first associated sub-sentence can be formed by the vocabulary V1, the vocabulary V3, and the vocabulary V4. Afterwards, when the associated sub-sentence generating unit 123 is configured to utilize the vocabulary V6 as the start point and go back to the root R via the path P2, the vocabulary V4, the vocabulary V3 and the vocabulary V1 are passed, and thus the second associated sub-sentence can be formed by the vocabulary V1, the vocabulary V3, the vocabulary V4 and the vocabulary V6. Afterwards, when the associated sub-sentences generating unit 123 is configured to utilize the vocabulary V7 as the start point and go back to the root R via the path P3, the vocabulary V5, the vocabulary V4, the vocabulary V3 and the vocabulary V1 are passed, and thus the third associated sub-sentence can be formed by the vocabulary V1, the vocabulary V3, the vocabulary V4, the vocabulary V5 and the vocabulary V7. In this case, because there are three key vocabularies, then there are three associated sub-sentences. It can be realized that the amount of the associated sub-sentences are related to the amount of the key vocabularies. The vocabularies of the associated sub-sentences are a part of the vocabulary set, and each associated sub-sentence will include a part of the at least one key vocabulary.

Figure 5:
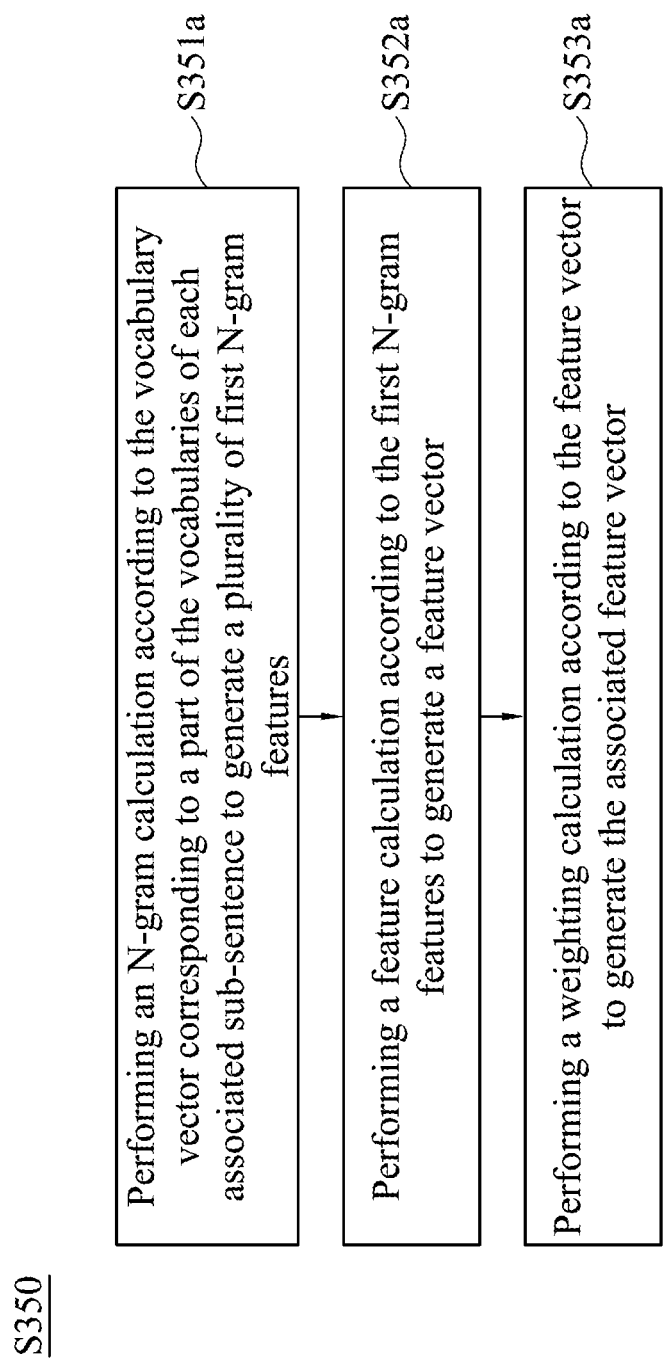
FIG. 5 is a flow diagram illustrating step S350 according to an embodiment of this disclosure.

Afterwards, the semantic analysis method 300 executes step S350 to calculate an associated feature vector between the associated sub-sentences. The step S350 further includes steps S351a~S353a. Reference is made to FIG. 5, which is a flow diagram illustrating step S350 according to an embodiment of this disclosure. The semantic analysis method 300 executes step S351a to perform an N-gram calculation according to the vocabulary vector corresponding to a part of the vocabularies of each associated sub-sentences to generate a plurality of first N-gram features. For example, reference is made to Table 1 and Table 2 as follows. The vocabulary vectors of first associated sub-sentence are shown in Table 1. Firstly, performing a bigram calculation, then the 2×1 matrix can be utilized to perform a convolution operation for the vocabulary vectors of the vocabulary V1, the vocabulary V3, and the vocabulary V4. Therefore, the bigram results of the first associated sub-sentence are shown in Table 2. For example, if the 2×1 matrix is $[1\ 2]^T$, the 2×1 matrix can be utilized to perform the convolution operation for the column vector (1, 2) in the first column of Table 1, and then the bigram result is 5 (in the matrix operation, $[1\ 2][1\ 2]^T=5$). Afterward, the 2×1 matrix can be utilized to perform the convolution operation for the column vector (2, 2) in the first column of Table 1, and then the bigram result is 6. For similar reason, the bigram of the column vector in the second column and the third column of Table 1 can be obtained by aforesaid matrix operation, and not to be further discussed here.

TABLE 1

|  |  | First column | Second column | Third column |
|---|---|---|---|---|
| vocabulary V1 | "Want" | 1 | 2 | 1 |
| vocabulary V3 | "To find" | 2 | 3 | 4 |
| vocabulary V4 | "Mobile phone" | 2 | 6 | 7 |

TABLE 2

| First column | Second column | Third column |
|---|---|---|
| 5 | 8 | 9 |
| 6 | 15 | 18 |

Afterwards, performing a trigram calculation, then the 3×1 matrix can be utilized to perform a convolution operation for the vocabulary vectors of the vocabulary V1, the vocabulary V3, and the vocabulary V4. Therefore, trigram results of the first associated sub-sentence are shown in Table 3. For example, if the 3×1 matrix is $[1\ 1\ 1]^T$, the 3×1 matrix can be utilized to perform the convolution operation for the column vector (1, 2, 2) in the first column of Table 1, and then the trigram result is 5 (in the matrix operation, $[1\ 2\ 2][1\ 1\ 1]^T=5$). For similar reason, the trigram of the column vector in the second column and the third column of Table 1 can be obtained by aforesaid matrix operation, and not to be further discussed here. The first N-gram features are the bigram result of the first associated sub-sentence and the trigram result of the first associated sub-sentence. In this case, in the N-gram calculation, N also can be set as four or five and the number of the N-gram calculation should not be limited thereto.

TABLE 3

| First column | Second column | Third column |
|---|---|---|
| 5 | 11 | 12 |

Afterwards, in the embodiment, reference is made to Table 4 and Table 5 as follows. The vocabulary vectors of second associated sub-sentence are shown in Table 4. Firstly, performing a bigram calculation, then the 2×1 matrix can be utilized to perform a convolution operation for the vocabulary vectors of the vocabulary V1, the vocabulary V3, the vocabulary V4 and the vocabulary V6. Therefore, the bigram results of the second associated sub-sentence are shown in Table 5. According to aforesaid embodiment, when the 2×1 matrix is $[1\ 2]^T$, the 2×1 matrix can be utilized to perform the convolution operation for the column vector (1, 2) in the first column of Table 4, and then the bigram result is 5. Afterward, the 2×1 matrix can be utilized to perform the convolution operation for the column vector (2, 2) in the first column of Table 4, and then the bigram result is 6. Afterward, the 2×1 matrix can be utilized to perform the convolution operation for the column vector (2, 7) in the first column of Table 4, and then the bigram result is 16. For similar reason, the bigram of the column vector in the second column and the third column of Table 4 can be obtained by aforesaid matrix operation, and not to be further discussed here.

TABLE 4

|  |  | First column | Second column | Third column |
|---|---|---|---|---|
| vocabulary V1 | "Want" | 1 | 2 | 1 |
| vocabulary V3 | "To find" | 2 | 3 | 4 |
| vocabulary V4 | "Mobile phone" | 2 | 6 | 7 |
| vocabulary V6 | "Samsung" | 7 | 8 | 9 |

TABLE 5

| First column | Second column | Third column |
|---|---|---|
| 5 | 8 | 9 |
| 6 | 15 | 18 |
| 16 | 22 | 25 |

Afterwards, performing a trigram calculation, then the 3×1 matrix can be utilized to perform a convolution operation for the vocabulary vectors of the vocabulary V1, the vocabulary V3, the vocabulary V4 and the vocabulary V6. Therefore, trigram results of the second associated sub-sentence are shown in Table 6. For example, if the 3×1 matrix is $[1\ 1\ 1]^T$, the 3×1 matrix can be utilized to perform the convolution operation for the column vector (1, 2, 2) in the first column of Table 1, and then the trigram result is 5 (in the matrix operation, $[1\ 2\ 2][1\ 1\ 1]^T=5$). Afterward, the 3×1 matrix can be utilized to perform the convolution operation for the column vector (2, 2, 7) in the first column of Table 4, and then the bigram result is 11. For similar reason, the trigram of the column vector in the second column and the third column of Table 4 can be obtained by aforesaid matrix operation, and not to be further discussed here.

TABLE 6

| First column | Second column | Third column |
|---|---|---|
| 5 | 11 | 12 |
| 11 | 17 | 20 |

Afterwards, for similar reason, the N-gram results of the third associated sub-sentence can be obtained by aforesaid calculation of the first associated sub-sentence and the second associated sub-sentence, and not to be further discussed here. The bigram results of the third associated sub-sentence are shown in Table 7, and the trigram results of the third associated sub-sentence are shown in Table 8. The first N-gram features are the bigram result of the second associated sub-sentence and the trigram result of the second associated sub-sentence, and the first N-gram features are the bigram result of the third associated sub-sentence and the trigram result of the third associated sub-sentence.

TABLE 7

| First column | Second column | Third column |
|---|---|---|
| 5 | 8 | 9 |
| 6 | 15 | 18 |
| 12 | 14 | 13 |
| 7 | 18 | 19 |

TABLE 8

| First column | Second column | Third column |
|---|---|---|
| 5 | 11 | 12 |
| 9 | 13 | 14 |
| 8 | 17 | 18 |

Afterwards, the semantic analysis method 300 executes step S352a to perform a feature calculation according to the first N-gram features to generate a feature vector. In the embodiment, when the first N-gram features are obtained, the feature calculation is performed. Reference is made to Table 2 and Table 3 as follows. Firstly, the maximum value is filtered for the bigram results of the first associated sub-sentence. Therefore, the maximum value selected from the first column of Table 2 is 6; the maximum value selected from the second column of Table 2 is 15, and then the maximum value selected from the third column of Table 2 is 18. After the maximum value filtering, the bigram results of the first associated sub-sentence can be realized as (6, 15, 18). Afterwards, the maximum value is filtered for the trigram results of the first associated sub-sentence. After the maximum value filtering, the trigram results of the first associated sub-sentence can be realized as (5, 11, 12). Afterwards, the feature vector of the first associated sub-sentence can be obtained by the combining the bigram results and the trigram results; in this case, the feature vector of the first associated sub-sentence is (11, 26, 30).

Afterwards, for similar reason, the feature vector of the second associated sub-sentence can be obtained by aforesaid calculation of the feature vector of the first associated sub-sentence, and not to be further discussed here. After the maximum value filtering, the bigram results of the second associated sub-sentence can be realized as (6, 22, 25), and the trigram results of the second associated sub-sentence can be realized as (11, 17, 20). Afterwards, the feature vector of the second associated sub-sentence can be obtained by the combining the bigram results and the trigram results; in this case, the feature vector of the second associated sub-sentence is (27, 39, 45).

Afterwards, for similar reason, the feature vector of the third associated sub-sentence can be obtained by aforesaid calculation of the feature vector of the first associated sub-sentence and the second associated sub-sentence, and not to be further discussed here. After the maximum value filtering, the bigram results of the third associated sub-sentence can be realized as (12, 18, 19), and the trigram results of the third associated sub-sentence can be realized as (9, 17, 18). Afterwards, the feature vector of the third associated sub-sentence can be obtained by the combining the bigram results and the trigram results; in this case, the feature vector of the third associated sub-sentence is (21, 35, 37).

Afterwards, the semantic analysis method 300 executes step S353*a* to perform a weighting calculation according to the feature vector to generate the associated feature vector. Amount of the at least one key vocabulary of the associated sub-sentences is utilized by the weighting calculation to decide a weight value. Based on aforesaid embodiment, there is one key vocabulary (vocabulary V4) in the first associated sub-sentence; there are two key vocabularies (vocabulary V4 and vocabulary V6) in the second associated sub-sentence and then there are two key vocabularies (vocabulary V4 and vocabulary V7) in the third associated sub-sentence. In this case, there are five key vocabularies, and thus the weight value of the first associated sub-sentence is 1/5; the weight value of the second associated sub-sentence is 2/5, and then the weight value of the third associated sub-sentence is 2/5. Therefore, in this case, the associated feature vector is calculated by Formula 1.

$$Associated feature\ \text{vector} = \\ \text{Feature vector of first associate clause} \times \frac{1}{5} + \\ \text{Feature vector of second associate clause} \times \frac{2}{5} + \quad \text{(Formula 1)}$$

-continued $$\text{Feature vector of third associate clause} \times \frac{2}{5}$$

Figure 6:
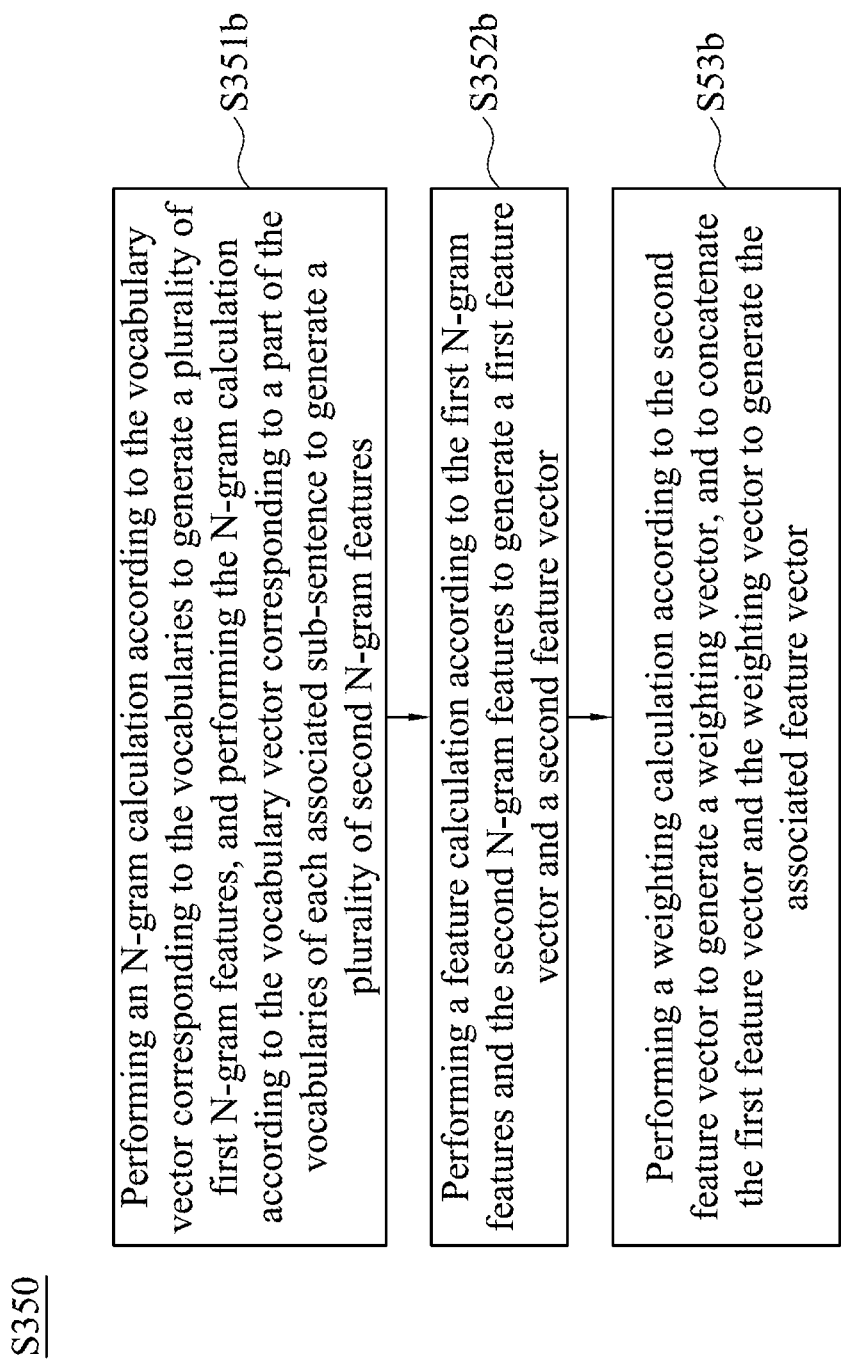
FIG. 6 is a flow diagram illustrating step S350 according to an embodiment of this disclosure.

In another embodiment, the semantic analysis method 300 executes step S350 to calculate an associated feature vector between the associated sub-sentences. The step S350 further includes steps S351*b*~S353*b*. Reference is made to FIG. 6, which is a flow diagram illustrating step S350 according to an embodiment of this disclosure. The semantic analysis method 300 executes step S351*b* to perform an N-gram calculation according to the vocabulary vector corresponding to the vocabularies to generate a plurality of first N-gram features, and to perform the N-gram calculation according to the vocabulary vector corresponding to a part of the vocabularies of each associated sub-sentence to generate a plurality of second N-gram features. For similar reason, calculation of the step S351*a* is similar with calculation of the step S351*b*, and not to be further discussed here. The difference between step S351*b* and step S351*a* is that the N-gram features of input sentence (it means the first N-gram features) is calculated by the step S351*b*.

Afterwards, the semantic analysis method 300 executes step S352*b* to perform a feature calculation according to the first N-gram features and the second N-gram features to generate a first feature vector and a second feature vector, respectively. Based on aforesaid embodiment, calculation of the step S352*a* is similar with calculation of the step S352*b*, and not to be further discussed here. The difference between step S352*b* and step S352*a* is that the N-gram feature vector of input sentence (it means the first feature vector) is calculated by the step S352*b*.

Afterwards, the semantic analysis method 300 executes step S353*b* to perform a weighting calculation according to the second feature vector to generate a weighting vector, and to concatenate the first feature vector and the weighting vector to generate the associated feature vector. In this embodiment, the weighting calculation of the second feature vector is similar with calculation of the step S353*a*, and not to be further discussed here. After the weighting calculation for the second feature vector, the weighting vector can be obtained by the calculated second feature vector. Afterwards, the associated feature vector can be obtained by the first feature vector concatenates with the weighting vector. For example, the weighting vector is (20, 33, 38), and the first feature vector is (29, 35, 44). After the concatenation processing, the associated feature vector is (29, 35, 44, 20, 33, 38).

Afterwards, the semantic analysis method 300 further executes step S360 to concatenate the associated feature vector and the vocabulary vector corresponding to each vocabulary to generate a vocabulary feature vector corresponding to each vocabulary. In the embodiment, the associated feature vector calculated by the step S350 is concatenated with each vocabulary vector to generate the vocabulary feature vector corresponding to each vocabulary. For example, when the vocabulary vector of the vocabulary V7 is (1, 7, 8) and the associated feature vector is (20, 33, 38). After the concatenation processing, the vocabulary feature vector of the vocabulary V7 is (1, 7, 8, 20, 33, 38). After aforesaid calculation, the vocabulary feature vector will include the data of the key vocabulary, and then it can be realized as increasing the relationships strength between the vocabularies. Therefore, when the vocabularies are classified by the semantic analysis model DB, the results of slot type can be more precise.

Afterwards, the semantic analysis method 300 further executes step S370 to analyze the vocabulary feature vector to generate an analysis result by a semantic analysis model DB. In the embodiment, before executing step S370, it is necessary to establish the semantic analysis model DB. The semantic analysis model DB is generated by the vocabularies, the vocabulary vector corresponding to each vocabulary, and the associated feature vector. Afterwards, the vocabularies, the vocabulary vector corresponding to each vocabulary, and the associated feature vector are inputted in Bi-LSTM model (Bidirectional LSTM) to perform the operation and then the semantic analysis model DB is generated. After the semantic analysis model DB is generated, the analysis results can be calculated by the semantic analysis model DB. The analysis results include a slot type corresponding to each vocabulary and an intent corresponding to the input sentence. Each vocabulary can be classified as the B-type, I-type or the O-type. The B-type is implemented as the beginning of the sentence. The I-type is implemented as the vocabulary following the vocabulary of the B-type. The O-type is implemented as the other vocabularies undefined.

Based on aforesaid embodiment, after aforesaid calculating vocabulary feature vector of the vocabulary V1~the vocabulary V8 and the inputting the calculation results into the semantic analysis model DB, the slot type of the vocabulary V6 and the vocabulary V7 are classified into the B-type; the slot type of the vocabulary V1, the vocabulary V2, the vocabulary V3, the vocabulary V4, the vocabulary V5 and the vocabulary V8 are classified into the O-type, and then the intent corresponding to the input sentence ("I want to find the Samsung mobile phone with the student discount") can be obtained (in this case, the intent of the input sentence can be realized as selecting smart phone).

Based on aforesaid embodiments, the semantic analysis method, semantic analysis system and non-transitory computer-readable medium are capable of utilizing the word property and the parse tree to find the key vocabularies and the associated sub-sentences, utilizing the N-gram calculation to calculate the feature vector, and calculating the intent corresponding to the input sentence and the slot type corresponding to each vocabulary. In some embodiments, this disclosure is able to increase the accuracy of natural language understanding techniques.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semantic analysis method, comprising:
   inputting a voice and recognizing the voice to generate an input sentence, wherein the input sentence has a plurality of vocabularies, and a vocabulary vector corresponds to each vocabulary;
   selecting at least one key vocabulary from the vocabularies according to a word property corresponding to each vocabulary;
   establishing a parse tree according to the input sentence and finding a plurality of associated sub-sentences according to the parse tree and the at least one key vocabulary, wherein each associated sub-sentence has a part of the vocabularies;
   calculating an associated feature vector between the associated sub-sentences;
   concatenating the associated feature vector and the vocabulary vector corresponding to each vocabulary to generate a vocabulary feature vector corresponding to each vocabulary; and
   analyzing the vocabulary feature vector to generate an analysis result by a semantic analysis model, wherein the analysis result has a slot type corresponding to each vocabulary and an intent corresponding to the input sentence.

2. The semantic analysis method of claim 1, further comprising:
   taking the vocabularies, the vocabulary vector corresponding to each vocabulary, and the associated feature vector as training data to generate the semantic analysis model.

3. The semantic analysis method of claim 1, further comprising:
   performing the word segmentation process for the input sentence to generate a vocabulary set, wherein the vocabulary set has the vocabularies.

4. The semantic analysis method of claim 1, wherein each associated sub-sentence has a part of the at least one key vocabulary.

5. The semantic analysis method of claim 1, wherein the step of calculating the associated feature vector between the associated sub-sentences further comprises:
   performing an N-gram calculation according to the vocabulary vector corresponding to a part of the vocabularies of each associated sub-sentence to generate a plurality of first N-gram features;
   performing a feature calculation according to the first N-gram features to generate a feature vector; and
   performing a weighting calculation according to the feature vector to generate the associated feature vector.

6. The semantic analysis method of claim 1, wherein step of the calculating the associated feature vector between the associated sub-sentences, further comprising:
   performing an N-gram calculation according to the vocabulary vector corresponding to the vocabularies to generate a plurality of first N-gram features;
   performing the N-gram calculation according to the vocabulary vector corresponding to a part of the vocabularies of each associated sub-sentence to generate a plurality of second N-gram features;
   performing a feature calculation according to the first N-gram features and the second N-gram features to generate a first feature vector and a second feature vector, respectively; and
   performing a weighting calculation according to the second feature vector to generate a weighting vector, and concatenating the first feature vector and the weighting vector to generate the associated feature vector.

7. The semantic analysis method of claim 5, wherein amount of the at least one key vocabulary of the associated sub-sentences is utilized by the weighting calculation to decide a weight value.

8. The semantic analysis method of claim 6, wherein amount of the at least one key vocabulary of the associated sub-sentences is utilized by the weighting calculation to decide a weight value.

9. A semantic analysis system, comprising:
an audio receiver, configured for receiving the voice;
a processor is electrically connected to the audio receiver, and the processor comprises:
  a voice recognition unit, configured for recognizing the voice to generate an input sentence, wherein the input sentence has a plurality of vocabularies, and a vocabulary vector corresponds to each vocabulary;
  a keyword selecting unit is electrically connected to the voice recognition unit, and configured for selecting at least one key vocabulary from the vocabularies according to a word property corresponding to each vocabulary;
  an associated sub-sentence generating unit is electrically connected to the keyword selecting unit, and configured for establishing a parse tree according to the input sentence and finding a plurality of associated sub-sentences according to the parse tree and the at least one key vocabulary, wherein each associated sub-sentences has a part of the vocabularies;
  a feature vector calculating unit is electrically connected to the associated sub-sentence generating unit, and configured for calculating an associated feature vector between the associated sub-sentences;
  a vocabulary vector generating unit is electrically connected to the feature vector calculating unit, and configured for concatenating the associated feature vector and the vocabulary vector corresponding to each vocabulary to generate a vocabulary feature vector corresponding to each vocabulary; and
  an analysis result generating unit is electrically connected to the vocabulary vector generating unit, and configured for analyzing the vocabulary feature vector to generate an analysis result by a semantic analysis model, wherein the analysis result has a slot type corresponding to each vocabulary and an intent corresponding to the input sentence; and
a storage device, configured for storing the input sentence and the semantic analysis model.

10. The semantic analysis system of claim 9, further comprising:
an analysis model generating unit is electrically connected to the vocabulary vector generating unit and the analysis result generating unit, and configured for taking the vocabularies, the vocabulary vector corresponding to each vocabulary, and the associated feature vector as training data to generate the semantic analysis model.

11. The semantic analysis system of claim 9, further comprising:
a word segmentation processing unit is electrically connected to the voice recognition unit and the keyword selecting unit, and configured for performing the word segmentation process for the input sentence to generate a vocabulary set, wherein the vocabulary set has the vocabularies.

12. The semantic analysis system of claim 9, wherein each associated sub-sentences has a part of the at least one key vocabulary.

13. The semantic analysis system of claim 9, wherein the feature vector calculating unit is further configured for performing an N-gram calculation according to the vocabulary vector corresponding to a part of the vocabularies of each associated sub-sentence to generate a plurality of first N-gram features; performing a feature calculation according to the first N-gram features to generate a feature vector; and performing a weighting calculation according to the feature vector to generate the associated feature vector.

14. The semantic analysis system of claim 9, wherein the feature vector calculating unit is further configured for performing an N-gram calculation according to the vocabulary vector corresponding to generate a plurality of first N-gram features; performing the N-gram calculation according to the vocabulary vector corresponding to a part of the vocabularies of each associated sub-sentences to generate a plurality of second N-gram features; performing a feature calculation according to the first N-gram features and the second N-gram features to generate a first feature vectors, respectively; and performing a weighting calculation according to the second feature vector to generate a weighting vector, and concatenating the first feature vector and the weighting vector to generate the associated feature vector.

15. The semantic analysis method of claim 13, wherein amount of the at least one key vocabulary of the associated sub-sentences is utilized by the weighting calculation to decide a weight value.

16. The semantic analysis method of claim 14, wherein amount of the at least one key vocabulary of the associated sub-sentences is utilized by the weighting calculation to decide a weight value.

17. A non-transitory computer-readable medium having one or more sequences of instructions to be executed by a processor for performing a semantic analysis method, wherein the method comprises:
inputting a voice and recognizing the voice to generate an input sentence, wherein the input sentence has a plurality of vocabularies, and a vocabulary vector corresponds to each vocabulary;
selecting at least one key vocabulary from the vocabularies according to a word property corresponding to each vocabulary;
establishing a parse tree according to the input sentence and finding a plurality of associated sub-sentences according to the parse tree and the at least one key vocabulary, wherein each associated sub-sentence has a part of the vocabularies;
calculating an associated feature vector between the associated sub-sentences;
concatenating the associated feature vector and the vocabulary vector corresponding to each vocabulary to generate a vocabulary feature vector corresponding to each vocabulary; and
analyzing the vocabulary feature vector to generate an analysis result by a semantic analysis model, wherein the analysis result has a slot type corresponding to each vocabulary and an intent corresponding to the input sentence.

* * * * *